United States Patent
Abe et al.

(10) Patent No.: US 9,376,008 B2
(45) Date of Patent: Jun. 28, 2016

(54) POWER PLANT FOR A VEHICLE

(71) Applicant: Nissan Motor Co., Ltd., Yokohama-shi, Kanagawa (JP)

(72) Inventors: Yutaka Abe, Sagamihara (JP); Kazuyuki Yamamoto, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 14/439,243

(22) PCT Filed: Oct. 25, 2013

(86) PCT No.: PCT/JP2013/078961
§ 371 (c)(1),
(2) Date: Apr. 29, 2015

(87) PCT Pub. No.: WO2014/083984
PCT Pub. Date: Jun. 5, 2014

(65) Prior Publication Data
US 2015/0291018 A1 Oct. 15, 2015

(30) Foreign Application Priority Data
Nov. 29, 2012 (JP) ................................. 2012-260552

(51) Int. Cl.
*B60K 1/00* (2006.01)
*B60K 6/48* (2007.10)
*B60K 6/543* (2007.10)
(Continued)

(52) U.S. Cl.
CPC ... *B60K 6/48* (2013.01); *B60K 1/00* (2013.01); *B60K 5/04* (2013.01); *B60K 5/1216* (2013.01); *B60K 6/40* (2013.01); *B60K 6/543* (2013.01); *F02D 29/02* (2013.01); *B60K 6/26* (2013.01); *B60K 2006/4808* (2013.01); *B60K 2006/4825* (2013.01); *B60Y 2200/92* (2013.01); *Y02T 10/626* (2013.01); *Y02T 10/6221* (2013.01); *Y10S 903/951* (2013.01)

(58) Field of Classification Search
CPC .............. B60K 6/46; B60K 6/36; B60K 6/48; B60K 6/365; B60K 5/1216; B60K 6/445
USPC ........................................ 180/65.1, 65.6, 312
See application file for complete search history.

(56) References Cited

U.S. PATENT DOCUMENTS 5,740,876 A * 4/1998 Shimose .............. B60K 5/1216
180/232
6,170,597 B1 * 1/2001 Fukuda .................. B60K 17/08
180/292

(Continued)

FOREIGN PATENT DOCUMENTS

JP 2-40935 U 3/1990
JP 3-56837 U 5/1991

(Continued)

*Primary Examiner* — Hau Phan
(74) *Attorney, Agent, or Firm* — Global IP Counselors, LLP

(57) ABSTRACT

A power plant for a vehicle of the present invention includes an electric motor attached to a transmission housing attached to an engine. The electric motor is attached to the side of the transmission housing toward the engine and is connected to the engine interposed by an anchor point. When the engine is viewed in a crankshaft direction, a line connecting the anchor point and the center of gravity of the electric motor intersects a line extending along a direction in which the electric motor vibrates due to vibration of the engine in the absence of an anchor point.

11 Claims, 5 Drawing Sheets

(51) Int. Cl.
*B60K 5/04* (2006.01)
*B60K 5/12* (2006.01)
*B60K 6/40* (2007.10)
*F02D 29/02* (2006.01)
*B60K 6/26* (2007.10)

(56) References Cited

U.S. PATENT DOCUMENTS

| | | | | |
|---|---|---|---|---|
| 6,371,229 | B1* | 4/2002 | Kakiuchi | B60K 5/1208 180/291 |
| 6,727,670 | B1* | 4/2004 | Grabowski | B60L 11/1861 318/139 |
| 7,740,093 | B2* | 6/2010 | Abe | B60K 6/365 180/65.6 |
| 7,797,089 | B2* | 9/2010 | Kozarekar | B60K 6/445 180/65.25 |
| 8,452,473 | B2* | 5/2013 | Ganley | B60K 6/485 180/65.1 |
| 8,511,410 | B2* | 8/2013 | Venturi | B60K 6/36 180/65.22 |
| 8,694,762 | B2* | 4/2014 | Ekberg | G06F 21/575 713/1 |
| 8,746,394 | B2* | 6/2014 | Kuramoto | B60K 5/02 180/292 |
| 8,813,883 | B2* | 8/2014 | Fujiwara | B60K 6/46 180/312 |
| 2006/0247086 | A1* | 11/2006 | Watanabe | B60K 6/365 475/208 |
| 2012/0137681 | A1* | 6/2012 | Hoess | B60K 6/48 60/607 |
| 2013/0264132 | A1* | 10/2013 | Fujiwara | B60K 6/46 180/65.245 |

FOREIGN PATENT DOCUMENTS

| | | |
|---|---|---|
| JP | 3-267527 A | 11/1991 |
| JP | 4-60119 A | 2/1992 |
| JP | 2001-173544 A | 6/2001 |
| JP | 3584680 B2 | 8/2004 |
| JP | 2005-75223 A | 3/2005 |
| JP | 2012-183879 A | 9/2012 |

* cited by examiner

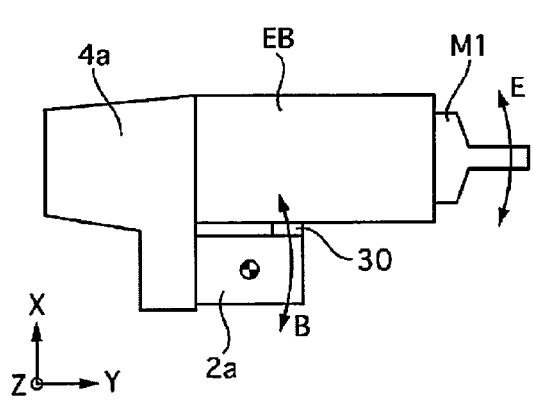
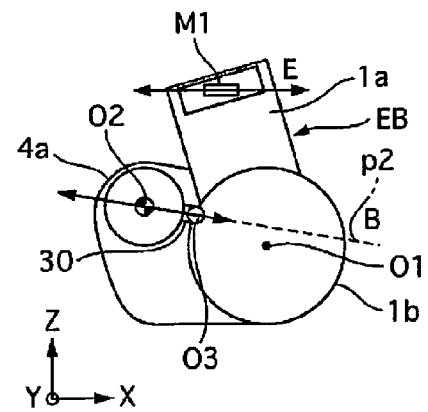
FIG. 4A  FIG. 4B
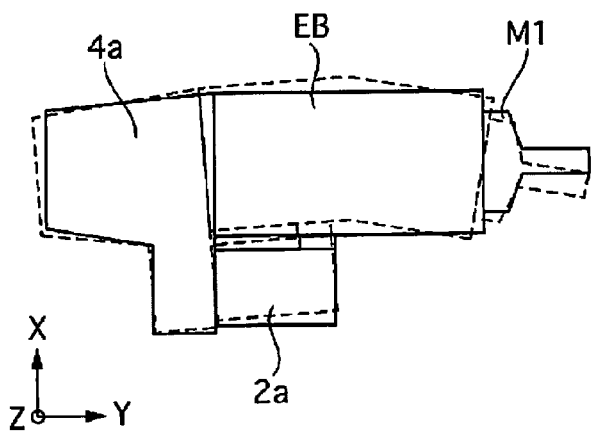
FIG. 5
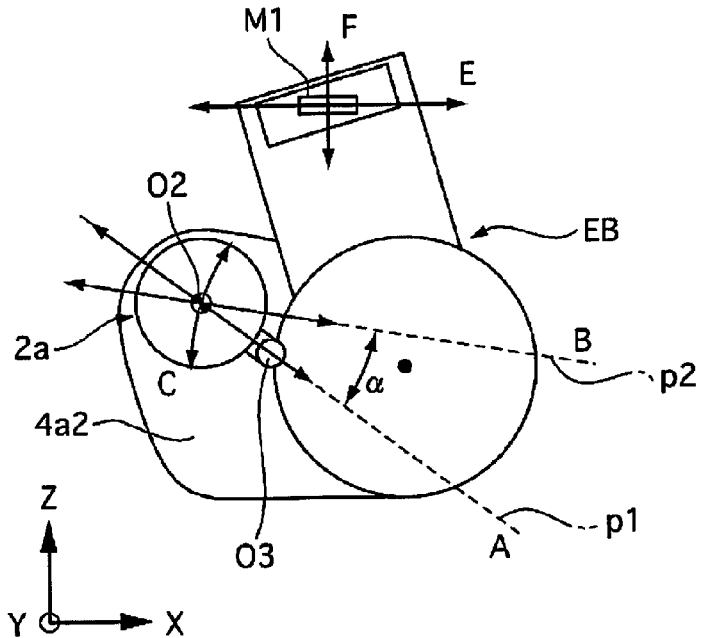
FIG. 6

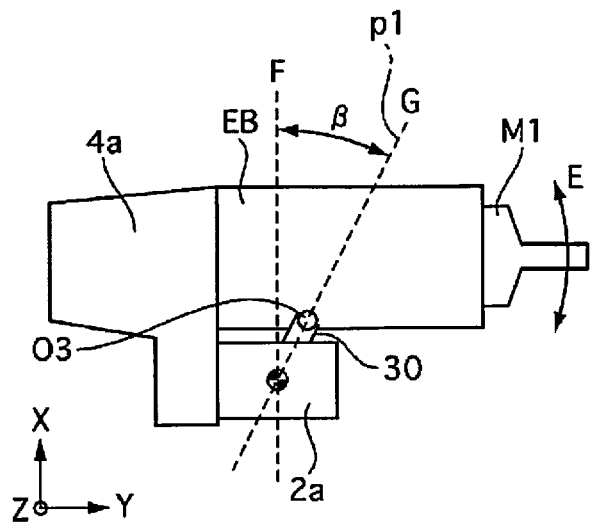 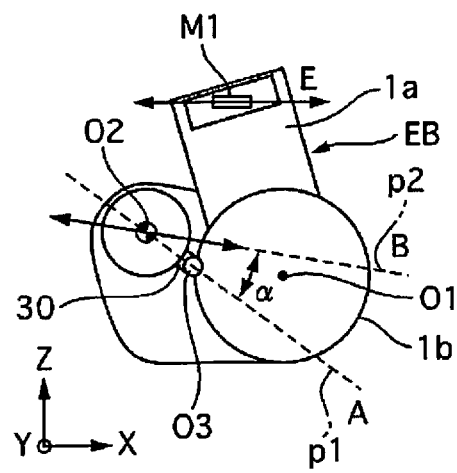
FIG. 9A    FIG. 9B
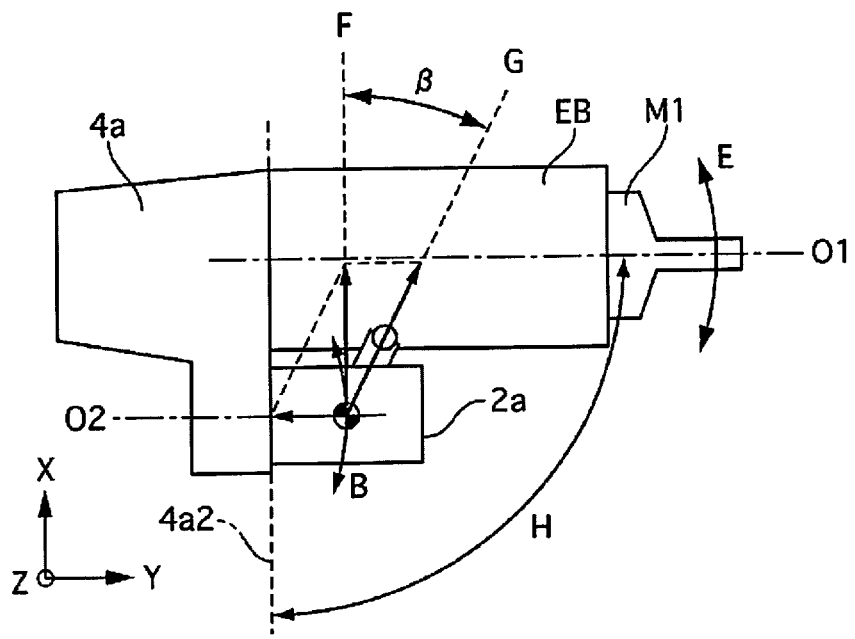
FIG. 10

US 9,376,008 B2

POWER PLANT FOR A VEHICLE

CROSS-REFERENCE TO RELATED APPLICATIONS

This application is a U.S. National stage application of International Application No. PCT/JP2013/078961, filed Oct. 25, 2013, which claims priority to JP Patent Application No. 2012-260552 filed on Nov. 29, 2012, the contents of each of which are hereby incorporated herein by reference.

BACKGROUND

1. Field of the Invention

The present invention relates to a power plant for a vehicle in which at least an engine is mounted.

2. Background Information

The vehicle described in JP Patent No. 3584680 is an example of a vehicle of such description. This vehicle comprises an engine and an electric motor as a power plant, and is of a type such that the engine is coupled to drive wheels via a continuously variable transmission and the electric motor is constantly linked to the drive wheels. In this vehicle, because sufficient support cannot be ensured merely by cantilevering the electric motor using the continuously variable transmission case, a housing of the electric motor and an engine block are connected by a support member (referred to as a "gusset" below), as shown in FIG. 3 of JP Patent No. 3584680, whereby the electric motor is supported.

SUMMARY

However, as a result of thorough investigations into the vibration characteristics obtained using the above configuration, a new problem was discovered in that, if the gusset is improperly arranged, vibration of the electric motor caused by engine vibration is transmitted back to the engine block via the gusset, whereby vibration of the power plant may increase.

This problem is addressed by the present invention, it being an objective thereof to provide a power plant for a vehicle in which increases in the vibration of the power plant can be minimized even if vibration is transmitted from the engine to the electric motor.

In order to achieve the above objective, the power plant for a vehicle of the present invention comprises an electric motor attached to a transmission housing attached to an engine, the electric motor being attached to the side of the transmission toward the engine and being connected to the engine interposed by an anchor point, a line that connects the center of gravity of the electric motor with the anchor point and a line that extends along a direction in which the electric motor would vibrate due to engine vibration in the absence of an anchor point intersecting when the engine is viewed in a crankshaft direction.

Thus, when the electric motor vibrates, the linear movement in the absence of an anchor point can be converted into a swinging movement about the anchor point, and vibration of the power plant can be minimized by diffusing force received from the electric motor by the engine via the anchor point.

BRIEF DESCRIPTION OF THE DRAWINGS

Referring now to the attached drawings which form a part of this original disclosure.

FIGS. 4A and 4B are a schematic views of the power plant for a vehicle of a comparative example.

FIG. 5 is a schematic plan view of the state of vibration of the power plant when engine vibration is generated in the comparative example.

FIG. 6 is a side view of the circumstances of vibration when vibration is generated in the power plant for a vehicle according to embodiment 1.

FIGS. 9A and 9B are schematic views of the power plant for a vehicle according to embodiment 2.

FIG. 10 is a plan view of forces when vibration is generated in the power plant for a vehicle according to embodiment 2.

DETAILED DESCRIPTION OF EMBODIMENTS

Embodiment 1

Figure 1:
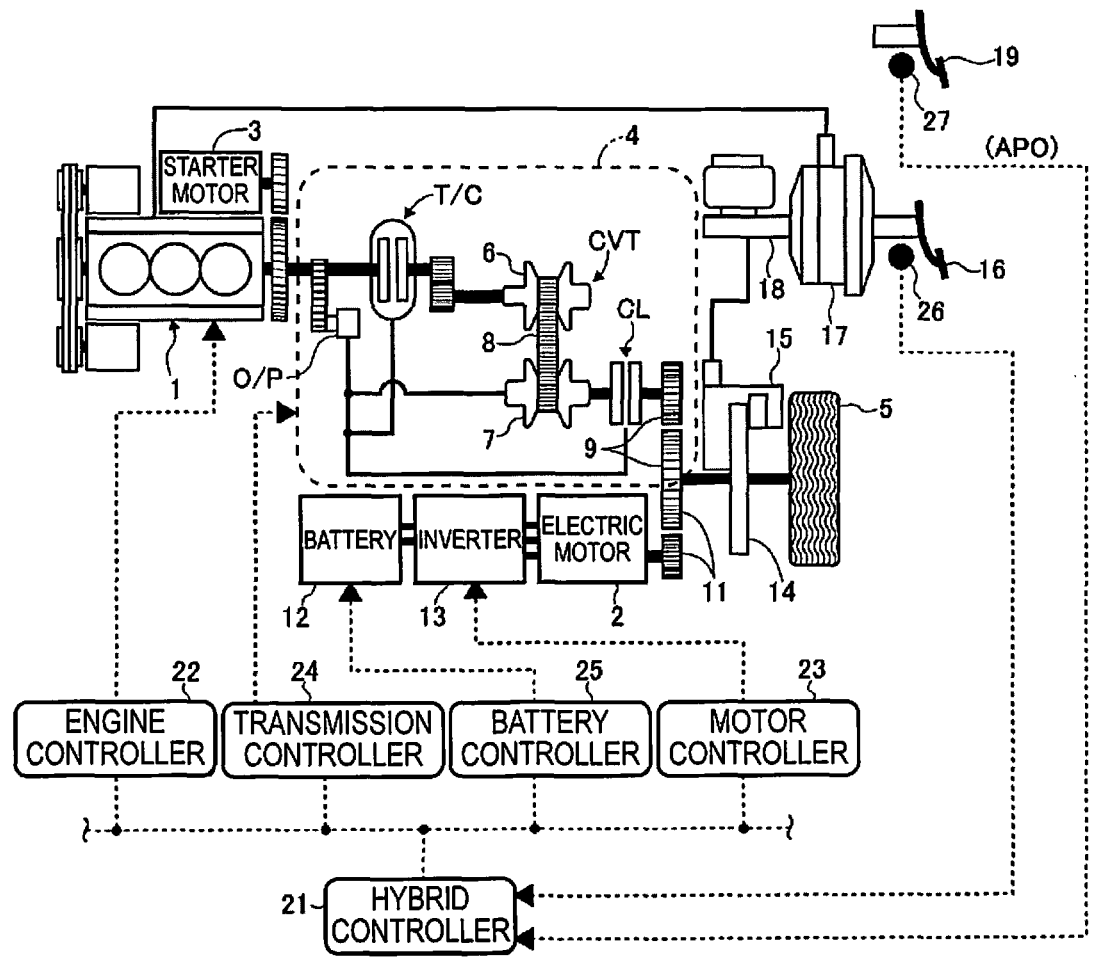
FIG. 1 is a schematic diagram of a drive train of a hybrid vehicle in which the power plant according to embodiment 1 is mounted, and a system for controlling the entirety of the drive train.

FIG. 1 is a schematic diagram of a drive train of a hybrid vehicle equipped with the power plant for a vehicle according to embodiment 1, and a system for controlling the entirety of the drive train. An engine 1 and an electric motor 2 are mounted in the hybrid vehicle of FIG. 1 as power sources, the engine 1 being started by a starter motor 3. The engine 1 is drive-coupled to a drive wheel 5 via a V-belt-type continuously variable transmission 4 so as to be able to be decoupled as appropriate from the drive wheel 5. A generic description of the V-belt-type continuously variable transmission 4 is given below.

The V-belt-type continuously variable transmission 4 is a continuously variable transmission CVT configured from a variator comprising a primary pulley 6, a secondary pulley 7, and a V-belt 8 bridging the pulleys 6, 7. The primary pulley 6 is linked to a crankshaft, which is an output shaft of the engine 1, interposed by a torque converter T/C to which a lock-up clutch is attached, and the secondary pulley 7 is linked to the drive wheel 5 interposed by a clutch CL and a final gear group 9 in the stated order.

Once the clutch CL has been engaged, power from the engine 1 is inputted to the primary pulley 6 via the torque converter T/C before reaching the drive wheel 5 via the V-belt 8, the secondary pulley 7, the clutch CL, and the final gear group 9 in the stated order, the power being made available for the traveling of the hybrid vehicle.

The electric motor 2 is constantly coupled to the drive wheel 5, and a final gear group 11 is interposed therebetween, the electric motor 2 driving the drive wheel 5 using electric power from a battery 12, and an inverter 13 being interposed therebetween.

The inverter 13 converts direct-current electric power from the battery 12 into alternating-current electric power and supplies this power to the electric motor 2, and, by reducing the electric power supplied to the electric motor 2, controls the driving power and the rotational direction of the electric motor 2.

The electric motor 2 also functions as a generator in addition to the motor driving described above, and is available for use in regenerative braking, which is described in detail below. During regenerative braking, the inverter 13 places a load generated by a regenerative braking force distribution on the electric motor 2, whereby the electric motor 2 is acts as a generator and the power generated by the drive motor 2 is stored in the battery 12.

In the hybrid vehicle of embodiment 1, the clutch CL is released and the electric motor 2 is driven while the engine 1 is in a stopped state, whereby only the power from the electric motor 2 reaches the drive wheel 5 via the final gear group 11, and the hybrid vehicle travels in an electric travel mode (EV mode) under the power of the electric motor alone. By releasing the clutch at this time, power can be kept from being excessively consumed during EV traveling without co-rotating the stopped engine 1.

When the clutch CL is engaged and the engine 1 is started by the starter motor 3 while in the EV traveling state described above, power from the engine 1 reaches the drive wheel 5 via the torque converter TIC, the primary pulley 6, the V-belt 8, the secondary pulley 7, the clutch CL, and the final gear group 9 in the stated order, and the hybrid vehicle travels in a hybrid travel mode (HEV mode) under the power of the engine 1 and the electric motor 2.

Once the hybrid vehicle is stopped from the travel state described above, or the hybrid vehicle is kept in this stopped state, a brake disc 14 rotating together with the drive wheel 5 is clamped by a caliper 15 to apply braking, whereby the objective is achieved. The caliper 15 is connected to a master cylinder 18 that moves in response to the force produced by a driver depressing a brake pedal 16 and outputs brake hydraulic pressure corresponding to the brake pedal depressing force boosted by a negative-pressure booster 17, the caliper 15 being moved by the brake hydraulic pressure and applying braking to the brake disc 14. Even when the hybrid vehicle is operating in the EV mode or the HEV mode, the drive wheel 5 is driven by torque in accordance with a drive force command that the driver issues by depressing an accelerator 19, the hybrid vehicle traveling under the drive force demanded by the driver.

Selection of the travel mode of the hybrid vehicle, control of the output of the engine 1, control of the rotational direction and output of the electric motor 2, control of the gear-changing of the continuously variable transmission 4, control of the engagement and release of the clutch CL, and control of the charging and discharging of the battery 12 are each performed by a hybrid controller 21. When so required, the hybrid controller 21 correspondingly performs these controls via an engine controller 22, a motor controller 23, a transmission controller 24, and a battery controller 25.

Therefore, a signal from a brake switch 26, which is a normally open switch for switching from OFF to ON during braking by depression of the brake pedal 16, and a signal from an accelerator position sensor 27 for detecting the amount of depression of the accelerator (accelerator position) APO are inputted to the hybrid controller 21. The hybrid controller 21 furthermore passes internal information back and forth between the engine controller 22, the motor controller 23, the transmission controller 24, and the battery controller 25.

The engine controller 22 controls the output of the engine 1 in response to commands from the hybrid controller 21, and the motor controller 23 controls the rotational direction and output of the electric motor 2 via the inverter 13 in response to commands from the hybrid controller 21. The transmission controller 24 controls the gear-changing of the continuously variable transmission 4 (V-belt-type continuously variable transmission mechanism) and controls the engagement and release of the clutch CL in response to commands from the hybrid controller 21, the controlling being performed using, as a medium, oil from an oil pump O/P by which the engine 1 is driven. The battery controller 25 controls the charging and discharging of the battery 12 in response to commands from the hybrid controller 21.

Figure 2:
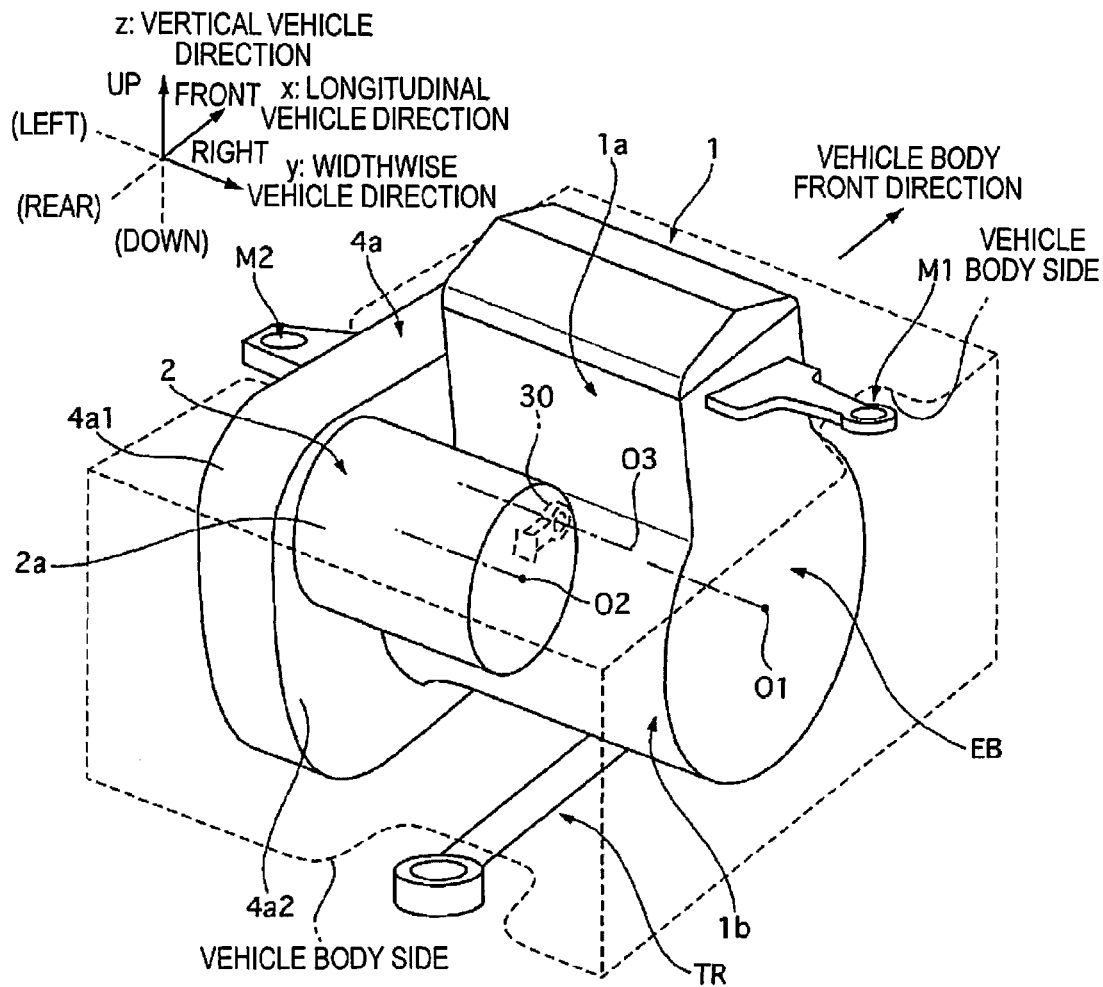
FIG. 2 is a schematic perspective view of the power plant for a vehicle according to embodiment 1 mounted in the vehicle.

FIG. 2 is a schematic perspective view of a state in which the power plant for a vehicle according to embodiment 1 is mounted in the vehicle. Descriptions for the drive shaft and the like are not given. The engine 1, the continuously variable transmission 4, and the electric motor 2 are described below as a single power plant.

The power plant is supported by a pendulum scheme having mounts M1, M2 from which the power plant is suspended, the mounts M1, M2 being disposed above the center of gravity of the power plant, and a torque rod TR for restricting movement of the power plant along a longitudinal vehicle direction, the torque rod TR being disposed below the center of gravity of the power plant. This minimizes the transmission of vibration from the power plant to the vehicle body and enhances ride quality while the vehicle is traveling. Below, an x direction is defined as the longitudinal vehicle direction, a y direction is defined as a widthwise vehicle direction, and a z direction is defined as a vertical vehicle direction. The power plant may be supported by any other method, so long as the relative positional relationship between the engine 1, the continuously variable transmission 4, and the electric motor 2 remains the same.

The engine 1 has an engine block EB comprising a cylinder block 1a in which a cylinder chamber is formed and a crank case 1b in which the crankshaft is mounted. A transmission housing 4a in which the continuously variable transmission 4 is mounted is attached to the left side of the engine block EB along the y direction. The transmission housing 4a has a bulging part 4a1 bulging radially outward from the engine block as viewed in the y direction, the electric motor 2 being attached to an engine attachment surface 4a2 of the bulging part 4a1. Specifically, the engine 1 and the electric motor 2 are attached to the engine attachment surface 4a2.

A motor rotating shaft 02 of the electric motor 2 is disposed parallel to a crankshaft 01 of the engine 1. The electric motor 2 has a cylindrical motor housing 2a in which a stator and a rotor are accommodated. The motor housing 2a is assembled on the engine attachment surface 4a2 of the transmission housing 4a. The electric motor 2 in the present embodiment is much larger than ordinary auxiliary equipment, making it difficult to cantilever the electric motor 2 using the transmission housing 4a. Therefore, a gusset 30, which is a reinforced connecting member, is disposed between the motor housing 2a and the engine block EB (crank case 1b). An anchor point 03, which is a part where the gusset 30 and the engine block EB are connected, is connected by a bolt or the like, and acts as a swinging pivot when the motor housing 2a swings, as described below. The electric motor 2 constitutes a support structure supporting the transmission housing 4a and the gusset 30, and minimizes the generation of vibration.

Figures 3A, 3B:
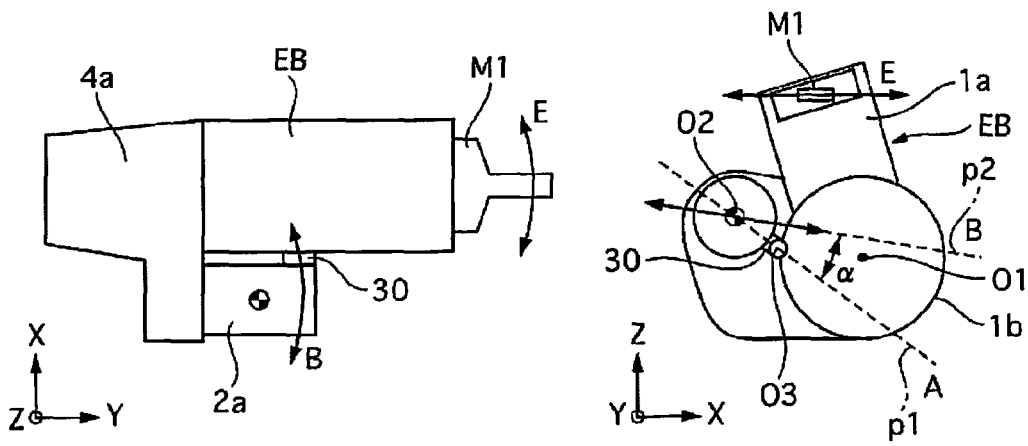
FIGS. 3A and 3B are a schematic views of the power plant for a vehicle according to embodiment 1.

The description of the power plant of embodiment 1 below will be given using a comparative example for contrasting purposes. FIGS. 3A and 3B are schematic views of the power plant for a vehicle of embodiment 1. FIGS. 4A and 4B are schematic views of the power plant for a vehicle of a comparative example. FIGS. 3A and 4A are front views as viewed in the z direction, and FIGS. 3B and 4B are side views as viewed in the y direction. The comparative example is the same as embodiment 1, except that the position of the anchor point 03 is higher than in embodiment 1. The center of gravity of the electric motor 2 including the gusset 30 is positioned approximately on the motor rotating shaft 02.

As shown in FIG. 3B, when viewed in the y direction (the direction along the crankshaft 01 of the engine 1), a line connecting the center of gravity of the electric motor 2 and the anchor point 03 is defined as a first line p1 extending along an A direction, and a line connecting from the center of gravity of the electric motor 2 to the anchor point 03 in the comparative example is defined as a second line p2 extending along a B direction. The B direction in the present embodiment is the direction in which the electric motor 2 maximally vibrates due to vibration of the engine 1 when the electric motor 2 is cantilevered in the absence of a gusset 30; the components along the longitudinal vehicle direction are typically large. The direction of vibration produced in the mounts M1, M2 along the longitudinal vehicle direction in the present embodiment is defined as an E direction. The B direction and the E direction may generally be considered to be the same direction, or may be considered to be slightly different directions due to various design parameters; however, these stipulations are not given by way of any particular limitation.

When vibration along the longitudinal vehicle direction is produced, longitudinal vibration is also generated in the mounts M1, M2 supporting the power plant. Such vibrations are readily perceived by the driver as discomforting sensations. In the comparative example, it is thus an objective to provide effective restriction in the direction in which the electric motor maximally vibrates; the anchor point 03 being provided on the second line p2 extending along the B direction.

However, thorough investigations yielded an unexpected result in the comparative example when vibration is generated, in regards to the nature of the vibration produced in the entire power plant. FIG. 5 is a schematic plan view of the state of vibration of the power plant when engine vibration is generated in the comparative example. As described above, when the electric motor 2 is cantilevered, the electric motor 2 strongly vibrates along the B direction; therefore, the gusset 30 is provided between the electric motor 2 and the engine 1, and the anchor point 03 is disposed on the second line p2. In this case, a large portion of the force produced by the vibration of the electric motor 2 may be received by the engine block via the gusset 30. The engine block may be caused to flex due to this received force, resulting in strong vibration of the entire power plant, and it was evident that the vibration could not be minimized to a reasonable level.

Figures 7A, 7B:
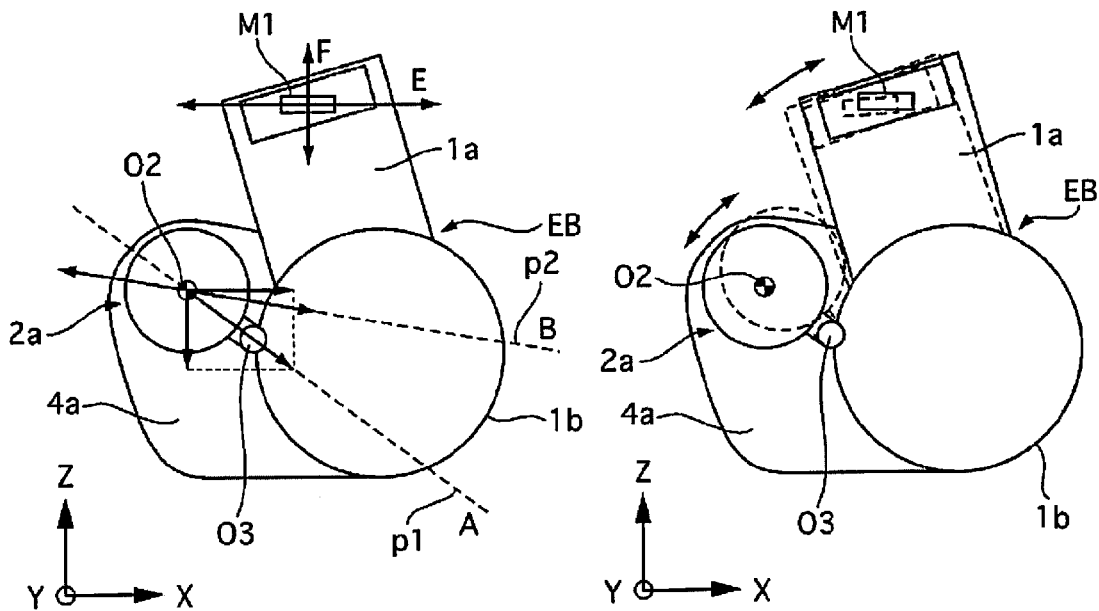
FIGS. 7A and 7B are side views of forces when vibration is generated in the power plant for a vehicle according to embodiment 1.

Therefore, in embodiment 1, the position of the anchor point 03 is changed and the first line p1 and the second line p2 are configured so as to intersect at an angle α (a first angle). The action will be described below. FIG. 6 is a side view of the circumstances of vibration when vibration is generated in the power plant for a vehicle of embodiment 1, and FIGS. 7A and 7B are side views of forces when vibration is generated in the power plant for a vehicle of embodiment 1. Due to engine vibration, the electric motor 2 vibrates along the B direction. Because the first line p1 and the second line p2 intersect at an angle α near the anchor point 03, the electric motor 2, in such circumstances, tracks along the B direction in a swinging movement about the anchor point 03, and performs the swinging movement shown by the C direction in FIG. 6.

Specifically, as shown in FIG. 7A, A-direction force received from the electric motor 2 by the engine block EB via the gusset 30 due to vibration is dispersed into an E-direction component and an F-direction component, when looking at the mount M1. Accordingly, vibration along the longitudinal direction is minimized, and vibration along the vertical direction is not recognized as becoming worse because such vibrations are not readily perceived by the driver as discomforting sensations. As shown in FIG. 7B, when viewed as a power plant, the electric motor 2 swings about the anchor point 03, whereby vibration can be absorbed, the force transmitted to the engine block EB-side is minimized, and increases in the vibration of the entire power plant can be avoided.

Figures 8A, 8B:
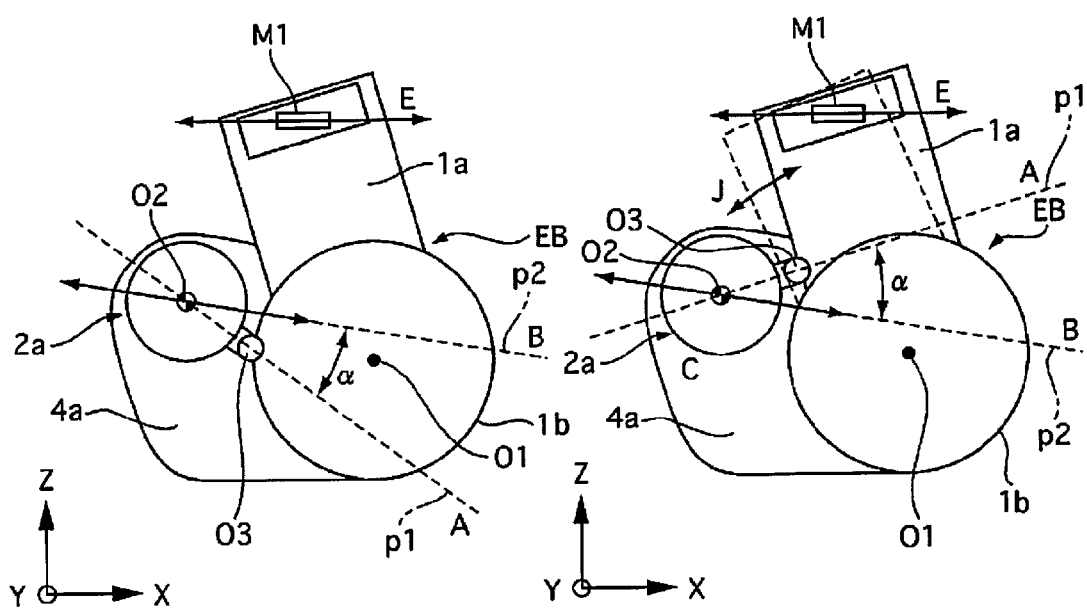
FIGS. 8A and 8B are schematic side views illustrating the positional relationship between a first line and a second line in embodiment 1.

There follows a description in regard to the angle α being set so that the first line p1 passes closer to the crankshaft 01 than does the second line p2. FIGS. 8A and 8B are schematic side views illustrating the positional relationship between a first line and a second line in embodiment 1. FIG. 8A illustrates the positional relationship in embodiment 1, and FIG. 8B illustrates the positional relationship in a second comparative example. In the second comparative example, angle α is set so that the first line p1 passes on the far side of the second line p2 relative to the crankshaft 01. In this case, as shown in FIG. 8B, the source of shaking when the engine block EB vibrates is a rolling movement around the crankshaft 01, and because the cylinder block 1a set apart from the crankshaft 01 swings about the crankshaft 01 to a greater degree than does the crank case 1b, the cylinder block 1a readily vibrates strongly. The direction of vibration of the cylinder block 1a in such circumstances is defined as J.

In this state, if the anchor point 03 of the gusset 30 is positioned so as to pass on the far side of the second line p2 relative to the crankshaft 01; i.e., if the anchor point 03 is disposed at a position close to the cylinder block 1a, the angle described by the first line p1 and the direction J of vibration of the cylinder block 1a decreases, making it difficult to disperse the force of the vibration produced in the space bordered on one side by the motor housing 2a. Therefore, the anchor point 03 of the gusset 30 in embodiment 1 is set so as to pass closer to the crankshaft 01 than does the second line p2 so that the angle described by the first line p1 and the direction J of vibration is made larger, dispersing the force of the vibration produced between the anchor point 03 and the motor housing 2a.

As described above, the action and effects enumerated below are obtained in embodiment 1.

(1) A vehicle comprising:

an engine 1;

a continuously variable transmission 4 (transmission) attached to the engine 1 and mounted in a transmission housing 4a; and an electric motor 2 (electric motor) attached to an engine attachment surface 4a2 (to the side of the transmission housing 4a toward the engine 1) and connected to the engine 1 interposed by an anchor point 03;

when the engine 1 is viewed in a crankshaft 01 direction, a first line p1 connecting the anchor point 03 and the center of gravity of the electric motor 2 (electric motor) including a gusset 30, and a second line p2 extending from the center of gravity of the electric motor 2 (electric motor) including a gusset 30 along a B direction in which the electric motor 2 (electric motor) vibrates due to vibration of the engine 1 in the absence of an anchor point 03, intersecting at an angle α (a first angle).

Accordingly, the electric motor 2 swings about the anchor point 03, whereby the vibration of the engine 1 and the electric motor 2 can be absorbed, force transmitted to the engine 1-side can be minimized, and increases in the vibration of the entire power plant can be avoided.

(2) The first line p1 passes closer to the crankshaft 01 than does the second line p2.

Accordingly, the angle described by the second line p2 and a direction J of vibration of mainly the cylinder block 1a of the engine block EB can be increased, enabling the force of the vibration produced in the space bordered on one side by the motor housing 2a to be dispersed.

(3) The vehicle is a hybrid vehicle in which drive force can be outputted by the electric motor 2.

Accordingly, taking the anchor point 03 of the gusset 30 into account when a large electric motor in which drive force can be ensured is installed in the transmission housing 4a makes it possible to provide a power plant in which vibration is minimized. The electric motor 2 can easily be installed particularly in the case of a configuration in which the electric motor 2 is installed on a shaft different from the crankshaft 01 and drive force is imparted from the electric motor 2 to a drive wheel.

(4) The power plant is supported by a pendulum scheme having mounts M1, M2 provided above the center of gravity of the power plant and a torque rod TR connected to the vehicle body below the center of gravity of the power plant.

Specifically, the power plant is supported by the pendulum scheme, whereby the transmission of vibration caused by rolling movement generated in the crankshaft to the vehicle body is minimized, and ride quality while the vehicle is traveling is enhanced. In such circumstances, the electric motor 2 readily vibrates due to a component in a longitudinal vehicle direction; however, the first line p1 and the second line p2 intersect, whereby vibration of the entire power plant is minimized.

Embodiment 2

Next, embodiment 2 will be described. The basic configuration is the same as in embodiment 1; therefore, only points of difference will be described. FIGS. 9A and 9B are schematic views of the power plant for a vehicle of embodiment 2. FIG. 9A is a plan view viewed in the z direction, and FIG. 9B is a side view viewed in the y direction. In embodiment 1, when viewed in the z direction, the gusset 30 is disposed so as to be perpendicular to the crankshaft 01 (or the motor rotating shaft 02). However, embodiment 2 differs in that, when viewed in the z direction, the first line p1 is configured so as to intersect a plane F orthogonal to the crankshaft 01 and inclusive of the center of gravity of the electric motor 2, the first line p1 intersecting the plane F at an angle β that is smaller than angle α.

The action of the vibration in the present embodiment when viewed in the y direction is fundamentally the same as in embodiment 1; therefore, the action when viewed in the z direction will be described in detail. FIG. 10 is a plan view of forces when vibration is generated in the power plant for a vehicle of embodiment 2. In this plan view, the direction in which the first line p1 extends is defined as a G direction.

The electric motor 2 is caused to vibrate along the B direction (vibrate within the plane F) due to engine vibration. Because the first line p1 intersects the plane F at an angle β, movement of the electric motor 2 along the B direction in such circumstances is dispersed in the G direction and the direction of the motor rotating shaft 02. Accordingly, the input of force to the engine block EB due to vibration can be minimized.

However, angle β is preferably smaller than angle α. Specifically, when the first line p1 intersects at angle β, force along the direction of the motor rotating shaft 02 acts on the engine attachment surface 4a2 of the transmission housing 4a, and force along a direction orthogonal to the crankshaft 01 acts on the engine attachment surface 4a2 via the engine block EB. Vibration may thereby be produced that would dislodge the engine block EB from the transmission housing 4a. The specific reason for such an event is that vibration, such as is shown by arrow H in FIG. 10, is generated between the crankshaft 01 and the engine attachment surface 4a2, whereby longitudinal vibration E in the mount M1 is increased, at which time the longitudinal vibration cannot be sufficiently suppressed.

As described above, the action and effects enumerated below are obtained in embodiment 2.

(5) The first line p1 intersects a plane F orthogonal to the crankshaft 01 of the engine 1 and inclusive of the center of gravity of the electric motor 2, the first line p1 intersecting the plane F at an angle β (a second angle) that is smaller than angle α.

Specifically, the first line p1 intersects the plane F at angle β, whereby vibration received by the engine block EB via the gusset 30 can be dissipated, and in particular, vibration in the longitudinal vehicle direction can be minimized. Setting the angle β smaller than angle α makes it possible to minimize vibration such as would dislodge the engine block EB from the transmission housing 4a, and in particular, to avoid worsening of vibration along the longitudinal vehicle direction due to excessive dispersing of the vibration.

The present invention is described above on the basis of the embodiments. However, the present invention is not limited to the above configuration; other configurations are also included in the present invention.

For example, in the embodiments, an example was illustrated in which an electric motor 2 is installed in a hybrid vehicle; however, the present example can similarly be applied to a case in which a large generator for supplying a drive current to a motor provided to another wheel is installed in the hybrid vehicle. Additionally, although an example of an electric motor was illustrated, the present invention may also be applied when a transfer is provided as a four-wheel drive unit.

In embodiment 1, the gusset 30 is disposed further outward (further opposite the transmission housing 4a) along the motor rotating shaft 02 relative to the center of gravity of the electric motor 2; however, the gusset 30 may be positioned on the motor rotating shaft 02 so as to be co-located with the center of gravity of the electric motor 2.

An example is given in embodiment 1 in which a continuously variable transmission 4 is installed in the hybrid vehicle. However, the present invention is not limited to the continuously variable transmission 4; a stepped variable transmission may be used instead. Additionally, instead of the clutch CL, a planetary gear mechanism comprising a plurality of friction-coupling elements may be installed in the hybrid vehicle, as may a sub-transmission in which gears can be appropriately changed.

Furthermore, although a configuration for performing an engine restart using a starter motor 3 is illustrated in the embodiments, other configurations will suffice. Specifically, in recent years, a technique has been put to practical use in which, in a vehicle having an idling stop function, an alternator is replaced with a motor generator, an alternator function and an engine start-up function being added to the motor generator, whereby the engine restart is performed by the motor generator rather than by a starter motor when the engine is to be restarted from an idling stop. The present invention may be configured such that an engine restart is performed by a motor generator such as is described above.

The invention claimed is:

1. A power plant for a vehicle, comprising:
   an engine;
   a transmission attached to the engine and mounted in a transmission housing; and
   an electric motor attached to a side of the transmission housing toward the engine and connected to the engine, the transmission housing and the engine being interposed by an anchor point,
   when the engine is viewed in a crankshaft direction, a first line connecting the anchor point and a center of gravity of the electric motor, and a second line extending from the center of gravity of the electric motor along a predetermined direction in which the electric motor vibrates due to vibration of the engine in the absence of the anchor point, intersect at a first angle.

2. The power plant for a vehicle as in claim 1, wherein the first line intersects a plane orthogonal to a crankshaft of the engine and inclusive of the center of gravity of the electric motor, the first line intersecting the plane at a prescribed angle of less than 90°.

3. The power plant for a vehicle as in claim 2, wherein the vehicle is a hybrid vehicle in which the electric motor is capable of outputting a drive force.

4. The power plant for a vehicle as in claim 2, further comprising
   a mount disposed above a center of gravity of the power plant and a torque rod connected to a vehicle body below the center of gravity of the power plant, so as to support the power plant by a pendulum scheme.

5. The power plant for a vehicle as in claim 1, wherein the vehicle is a hybrid vehicle in which the electric motor is capable of outputting a drive force.

6. The power plant for a vehicle as in claim 5, further comprising
   a mount disposed above a center of gravity of the power plant and a torque rod connected to a vehicle body below the center of gravity of the power plant, so as to support the power plant by a pendulum scheme.

7. The power plant for a vehicle as in claim 1, further comprising
   a mount disposed above a center of gravity of the power plant and a torque rod connected to the vehicle body below a center of gravity of the power plant, so as to support the power plant by a pendulum scheme.

8. The power plant for a vehicle as in claim 1, further comprising
   a connecting member disposed between the transmission housing and the engine, the connecting member including the anchor point.

9. The power plant for a vehicle as in claim 8, wherein the connecting member connects to the engine to define a swinging pivot of the electric motor with respect to the engine.

10. The power plant for a vehicle as in claim 8, wherein the connecting member is provided spaced from an attachment point of where the electric motor is attached the side of the transmission housing in the crankshaft direction.

11. The power plant for a vehicle as in claim 8, wherein the connecting member is a gusset that is provided between the electric motor and the engine.

* * * * *